US010652030B1

(12) United States Patent
Levy et al.

(10) Patent No.: US 10,652,030 B1
(45) Date of Patent: May 12, 2020

(54) DIGITAL CERTIFICATE FILTERING BASED ON INTRINSIC AND DERIVED ATTRIBUTES

(71) Applicant: Amazon Technologies, Inc., Seattle, WA (US)

(72) Inventors: Marcel Andrew Levy, Seattle, WA (US); Peter Zachary Bowen, Bainbridge Island, WA (US); Todd Lawrence Cignetti, Ashburn, VA (US); Brandonn Gorman, Seattle, WA (US); Ronald Andrew Hoskinson, Oak Hill, VA (US); Brenda Lee Leary, Kirkland, WA (US); Timothy Sterling Loverin, Lakewood, WA (US); James Spencer, Redmond, WA (US); Nicholas Wexler, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 254 days.

(21) Appl. No.: 15/912,184

(22) Filed: Mar. 5, 2018

(51) Int. Cl.
*H04L 29/06* (2006.01)
*H04L 9/32* (2006.01)

(52) U.S. Cl.
CPC ........ *H04L 9/3268* (2013.01); *H04L 63/0823* (2013.01); *H04L 63/102* (2013.01)

(58) Field of Classification Search
CPC . H04L 9/3263; H04L 9/3268; H04L 63/0823; H04L 63/102
See application file for complete search history.

(56) References Cited

U.S. PATENT DOCUMENTS

| 6,718,470 | B1 * | 4/2004 | Adams | G06F 21/33 |
| | | | | 713/175 |
| 2007/0260874 | A1 * | 11/2007 | Adams | H04L 9/3263 |
| | | | | 713/156 |
| 2007/0300059 | A1 * | 12/2007 | Yoneda | G06Q 20/02 |
| | | | | 713/156 |

* cited by examiner

*Primary Examiner* — Minh Dinh
(74) *Attorney, Agent, or Firm* — Lowenstein Sandler LLP (57) ABSTRACT

A method and system for generating multiple profiles corresponding to different digital certificates. The profile includes intrinsic attributes and derived attributes associated with a digital certificate. The system enables a customer system to filter digital certificates based on a suitability of the various digital certificates for use with a given application to be executed by or on behalf of the customer system. The suitability may be determined based on a comparison of certificate requirements associated with a customer system's request and one or more of the intrinsic attributes and derived attributes.

20 Claims, 7 Drawing Sheets

DIGITAL CERTIFICATE FILTERING BASED ON INTRINSIC AND DERIVED ATTRIBUTES

BACKGROUND

In many computing environments, a customer system may wish to execute an application in a secure manner. To secure communications between the deployed application and an end-user, a digital certificate may be used to verify or prove information about the end-user to the customer system and/or about the customer system to the end-user. In conventional cloud computing environments, a certificate manager is used to store and provide certificates to customer systems for use with an application. However, not all digital certificates are suitable or appropriate for all applications.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Embodiments described herein relate to systems and methods for storing and providing digital certificates to a variety of different applications. In one embodiment, a certificate management system is provided to enable a customer system to filter digital certificates based on a suitability of the various digital certificates for use with a given application to be executed by or on behalf of the customer system.

In one embodiment, the digital certificate management system identifies multiple different digital certificates. Example digital certificates include, but are not limited to, any public key certificate, such as an X.509 certificate, a transport layer security (TLS)/secure sockets layer (SSL) server certificate, a TLS/SSL client certificate, an e-mail certificate, a code signing certificate, a qualified certificate, a root certificate, an intermediate certificate, an end-entity certificate, a self-signed certificate, etc. In one embodiment, the digital certificates may be received from various certificate sources, such as one or more customer systems. For each of the digital certificates, the digital certificate management system generates a profile including one or more intrinsic attributes of the digital certificate. An intrinsic attribute includes a characteristic, parameter, classifier, etc. that may be extracted from the fields, contents, or metadata of the digital certificate. Example intrinsic attributes include, but are not limited to, a key algorithm (e.g., Rivest-Shamir-Adleman (RSA) cryptography, Elliptic-curve (EC) cryptography, digital signature algorithm (DSA) cryptography, etc.), a key size (e.g., 1024 bits, 2048 bits, 4096 bits, 8192 bits, etc.), a signature algorithm type, a key usage, an authority key identifier, certificate policies, certificate revocation list (CRL) points, enhanced key usage, issuer alternative name, key usage, name constraints, policy constraints, policy mappings, private key usage period, subject alternative name, subject directory attributes, subject key identifier, etc.

In one embodiment, the digital certificate management system generates one or more derived attributes for inclusion in the digital certificate profile. In one embodiment, a derived attribute may be generated by applying one or more heuristics to the intrinsic attributes, metadata associated with the digital certificate, or a combination thereof. Example derived attributes may include, but are not limited to, a public key type (e.g., the key algorithm and key size), whether a digital certificate has a fully qualified domain name, whether a digital certificate is usable as a server TLS certificate, one or more clients (e.g., a mobile device, a laptop, an internet of things (TOT) device, etc.), whether a digital certificate is imported from a customer system, etc. In one embodiment, the one or more derived attributes are "derived" or determined based on an analysis of one or more of the intrinsic attributes and/or metadata of a digital certificate.

In one embodiment, the digital certificate management system maintains an inventory of the profiles associated with various digital certificates. In one embodiment, a request to identify one or more digital certificates suitable for use with an application may be received from a customer system. In one embodiment, the request identifies the application and one or more certificate requirements. In one embodiment, the one or more certificate requirements may be determined by the system based on an analysis of the traffic patterns associated with the application, a browser type associated with the application, a market type or environment associated with the application (e.g., the projected market that is using the application), etc. Based on the request, the digital certificate management system compares the one or more certificate requirements to the profiles stored in the certificate inventory. The comparison of each of the profiles and their associated intrinsic and derived attributes to the one or more certificate requirements results in the generation of a suitability rating or score.

In one embodiment, the digital certificate management system filters the available digital certificates to identify the one or more digital certificates that are suitable for use with the identified application. In one embodiment, the digital certificate management system filters the certificate inventory to identify the "best" or "optimal" digital certificate for use with the application. In one embodiment, the digital certificate management system provides the customer system with a list of digital certificates that remain after filtering the digital certificates based on suitability in view of the one or more certificate requirements. In one embodiment, the customer system may use the list provided by the digital certificate management system to select one or more digital certificates for use with the identified application. Advantageously, according to embodiments, an optimized digital certificate can be employed in connection with an application, wherein both intrinsic and derived attributes of the digital certificate may be mapped and considered in view of the requirements of the application. In one embodiment, the digital certificate management system may receive, from the customer system, a selection of a digital certificate from the list. In response to the selection, the digital certificate management system may generate a certificate call (e.g., to the certificate inventory, a certificate authority, other certificate provider, etc.) including data associated with the customer system (e.g., customer data) and provision (e.g., provide, transmit, send, etc.) the selected digital certificate bound to the customer data to the customer system for use with the application.

A digital certificate may include a variety of information and a number of different fields, such as, for example, a version number, a serial number, a certificate algorithm identifier, an issuer name, a validity period, a subject name, subject public key information, an issued unique identifier, a subject unique identifier, multiple extensions, a certification authority's digital signature, etc.

Figure 1:
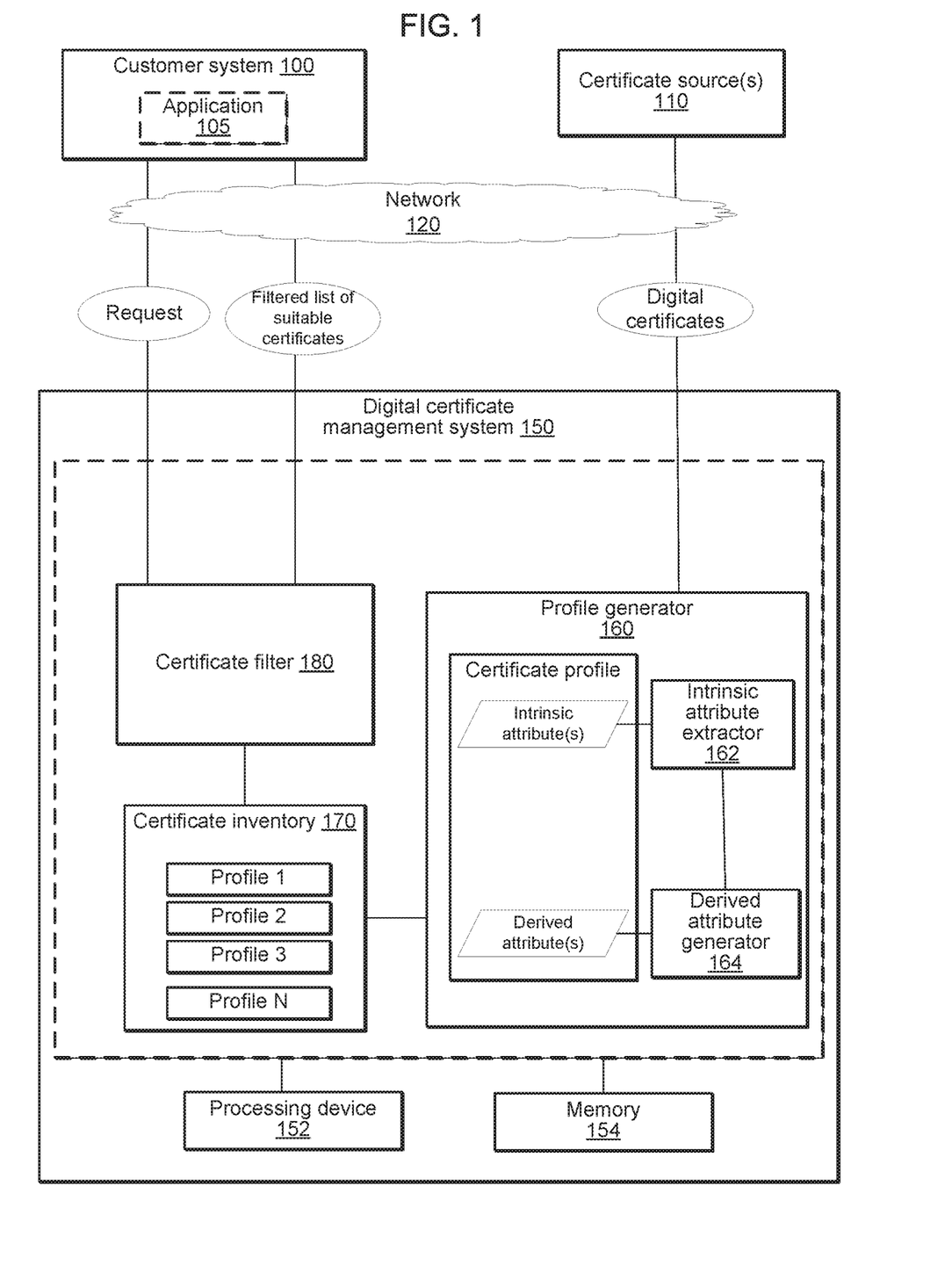
FIG. 1 illustrates an example environment including a certificate management system, according to one embodiment.

FIG. 1 is a block diagram illustrating an example cloud computing environment including a digital certificate management system 150 operatively coupled to a customer system 100 and one or more certificate sources 110. In one embodiment, the digital certificate management system 150 communicates with the customer system 100 and the certificate sources 110 via one or more suitable networks 120, including, for example, the Internet, intranets, extranets, wide area networks (WANs), local area networks (LANs), wired networks, wireless networks, or other suitable networks, etc., or any combination of two or more such networks. In one embodiment, the digital certificate management system 150 may further include a processing device 152 and a memory 154 configured to execute and store instructions associated with the functionality of the various components, services, modules, execution engines, applications, and programs of the digital certificate management system 150, as described in greater detail below in connection with FIGS. 2-5.

The digital certificate management system 150 may execute on one or more physical machines (e.g., computing devices) and/or on one or more virtual machines hosted by physical machines. The physical machines may be rack-mount servers, desktop computers, or other computing devices. The virtual machines may be managed and provided by a cloud provider system. Each virtual machine offered by a cloud service provider may be hosted on a physical machine configured as part of a cloud. Such physical machines are often located in a data center.

In one embodiment, the digital certificate management system 150 identifies one or more digital certificates based on information received or collected from one or more certificate sources 110. In one embodiment, the certificate source 110 may be any suitable computing device or system (e.g., a desktop computer, a laptop computer, a mobile device, a server, a virtual computing system, etc.) that generates, stores, maintains, distributes, or provides a digital certificate, such as for example, a certificate authority or a customer system. In one embodiment, the digital certificate management system 150 includes a profile generator 160. The profile generator 160 includes processing logic that may comprise hardware (e.g., circuitry, dedicated logic, programmable logic, microcode, etc.), software (e.g., instructions stored in a memory (e.g., memory 154) run on a processing device, such as processing device 152), or a combination thereof. In one embodiment, the profile generator 160 is configured to generate a profile for each of the identified digital certificates and provide the generated profile to a certificate inventory 170. In one embodiment, the certificate inventory 170 is a data store configured to store the one or more profiles (e.g., profile 1, profile 2, profile 3, and profile N) generated by the profile generator 160.

In one embodiment, the profile generator 160 includes an intrinsic attribute extractor 162 configured to identify, collect, capture or extract one or more intrinsic attributes associated with a digital certificate. A digital certificate may include a variety of information and a number of different fields, such as, for example, a version number, a serial number, a certificate algorithm identifier, an issuer name, a validity period, a subject name, subject public key information, an issued unique identifier, a subject unique identifier, multiple extensions, a certificate authority's digital signature, etc. In one embodiment, the intrinsic attribute extractor 162 executes one or more rules configured to identify and extract intrinsic attributes from the one or more fields and/or metadata of the digital certificate.

In one embodiment, the profile generator 160 includes a derived attribute generator 164 configured to generate or derive one or more additional attributes (referred to as "derived attributes) based on the intrinsic attributes and/or metadata associated with the digital certificate. In one embodiment, the derived attribute generator 164 applies a set of rules or heuristics to the intrinsic attributes, metadata, or a combination thereof to determine further attributes associated with the digital certificate that are relevant to determine a suitability of the digital certificate for use with various applications. In one embodiment, the derived attribute generator 164 maintains a hierarchical set of heuristics or rules configured to identify whether a given digital certificate exhibits particular characteristics, parameters, values, etc. that are not capable of determination based on an extraction of information directly from one or more fields associated with the digital certificate. In one embodiment, the heuristics relate to a library of possible derived attributes that may be associated with the digital certificate and used to generate the certificate profile for the digital certificate. In one example, a derived attribute referred to as a "public key type" may be derived or generated based on combining a first intrinsic attribute relating to the public key algorithm (e.g., RSA) and a second intrinsic attribute relating to the key size (e.g., 2048-bit), wherein the derived public key type attribute has a value of "RSA-2024").

In one embodiment, the digital certificate management system 150 includes a certificate inventory 170 configured to store the one or more profiles (e.g., profile 1, profile 2, profile 3, and profile N) generated by the profile generator 160. In one embodiment, the certificate inventory 170 may be any suitable data store (e.g., a database) that stores the profiles in an indexed and searchable configuration.

In one embodiment, a customer system 100 may send a request to the digital certificate management system 150. The request may be for information relating to suitable digital certificates for use with an application 105 that is executed by or on behalf of the customer system 100. It is noted that the application 105 is shown in dashed line to indicate that the application 105 may be executed or hosted by the customer system 100 or remotely executed or hosted (e.g., in a cloud computing environment) on behalf of the customer system 100. In one embodiment, the request includes information identifying the application 105 for which a digital certificate is desired.

In one embodiment, a certificate filter 180 is employed to analyze the request from the customer system 100 and generate a filtered list of suitable digital certificates. In one embodiment, the certificate filter 180 identifies one or more digital certificate requirements based on the information in the request or otherwise known about the application 105. In one embodiment, the certificate filter 180 determines the one or more certificate requirements by examining one or more of the traffic patterns associated with the application, a browser type associated with the application, a market type or environment associated with the application (e.g., the projected market that is using the application), etc. In one embodiment, the certificate filter 180 may maintain a data store including information associated with multiple different applications, client types, networks, etc. that may be aggregated and updated based on previous filtering activities of the certificate filter 180.

In one embodiment, the certificate filter 180 compares the one or more certificate requirements with the one or more profiles of the certificate inventory 170. In one embodiment, based on the comparison of the intrinsic attributes and derived attributes of the certificate profile and the certificate requirement(s), the certificate filter 180 generates a suitability rating or score for each profile as it relates to the application 105. In one embodiment, the certificate filter 180 may determine the suitability scores for the respective profiles by calculating a value representing a level of matching between the identified attributes of the digital certificate (determined and stored in the certificate profile) and the certificate requirements. For example, for an application ABC, profile 1 may have a suitability score of 85 (on a scale of 0 to 100), profile 2 may have a suitability score of 73, and profile N may have a suitability score of 91. In this example, the certificate filter 180 may generate a list including the profiles ranked in order from highest to lowest based on the calculated suitability metric. In one embodiment, the certificate filter 180 may compare each of the calculated suitability scores with a threshold suitability value, such that the certificate filter 180 includes the certificate profiles having suitability scores that equal or exceed the threshold suitability value. In one embodiment, the certificate filter 180 may generate a list including information relating to only the digital certificate having the highest relative suitability score, such that the identified digital certificate represents a "recommended" or optimal digital certificate for use with the identified application 105.

Figure 2:
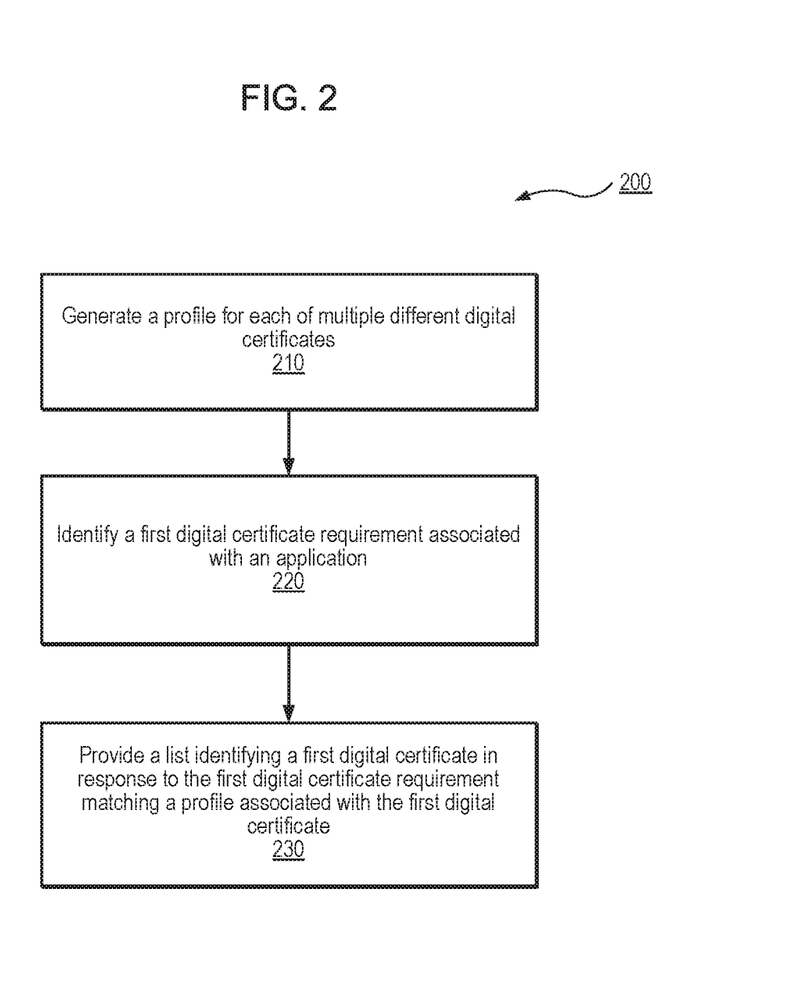
FIG. 2 is a flow diagram illustrating an example method of managing matching of an application and one or more suitable digital certificates, according to one embodiment.

FIG. 2 illustrates a flowchart that provides an example of a process 200 executed by a system (e.g., digital certificate management system 150 of FIG. 1) operatively coupled to a customer system (e.g., customer system 100 of FIG. 1) to service a request for information relating to a suitability of one or more digital certificates for use with an application, according to various embodiments. It is understood that the flowchart of FIG. 2 provides an example of the many different types of functional arrangements that may be employed to implement the operation of the digital certificate management system, as described herein. Process 200 may be performed by a processing logic that may comprise hardware (e.g., circuitry, dedicated logic, programmable logic, microcode, etc.), software (e.g., instructions stored in a memory (e.g., memory 154) run on a processing device (e.g., processing device 152 of FIG. 1), or a combination thereof.

In block 210, the digital certificate management system generates a profile for each of multiple different digital certificates. In one embodiment, the multiple different digital certificates may be identified via interactions with one or more certificate sources (e.g., a certificate authority, a customer system, a third party certificate vendor, etc.). In one embodiment, a profile for a digital certificate includes one or more intrinsic attributes and one or more derived attributes. In one embodiment, the intrinsic attributes are determined by extracting information from one or more fields of the digital certificate. In one embodiment, a derived attribute is generated by applying one or more heuristics or rules to the intrinsic attributes and/or metadata of the digital certificate. In one embodiment, each profile corresponding to a digital certificate includes multiple intrinsic attributes, derived attributes, metadata, and other information relating to the digital certificate that may be used in determining a suitability score associated with an application.

In block 220, the digital certificate management system identifies a first digital certificate requirement associated with an application. In one embodiment, a request is received from a customer system that identifies an application for which a suitable digital certificate is desired. In one embodiment, based on the request, the digital certificate management system identifies one or more digital certificate requirements. For example, a request may relate to a web server application and have a digital certificate requirement indicating a need for a fully qualified domain name (e.g., an absolute domain name including a hostname and a complete domain name that specifies a particular location in a tree hierarchy of a Domain Name System (DNS)) for use with a web server application. In this regard, a web server application requires a digital certificate that includes (e.g., in its 'subject name' field) a fully qualified domain name. In one embodiment, if a digital certificate does not have a fully qualified domain name, it is not considered suitable for use with a web server application.

If, in another example, the application is a code signing application, a fully qualified domain name may not be a requirement of the certificate considered during the filtering process. In one embodiment, the one or more digital certificate requirements associated with a request may be any information suitable for use in filtering available digital certificates to meet the requirements of a digital certificate as it relates to us with the particular application.

In block 230, the digital certificate management system generates and provides a list identifying a first digital certificate in response to the first digital certificate requirement matching a profile associated with the first digital certificate. In one embodiment, the first digital certificate requirement (and any additional requirements if multiple requirements are identified in block 220) is compared to the intrinsic and derived attributes of each of the digital certificate profiles generated in block 210. In one embodiment, a suitability score may be generated based on the comparison of the one or more certificate requirements associated with the particular application and the digital certificate profiles maintained by the system. In one embodiment, the list generated by the digital certificate management system includes an ordered list of digital certificates ranked based on their corresponding suitability scores. In one embodiment, the list may include information identifying a single digital certificate having a highest relative suitability score (e.g., the first digital certificate of FIG. 2). In one embodiment, the suitability score used to filter the available digital certificates based on the needs of the particular application may be generated based on the comparison of the one or more digital certificate requirements and the attributes and other information included in the respective digital certificate profile. The digital certificate profile may be used to enable the management and filtering of the corresponding digital certificate for use with a particular application (e.g., an application executed by or on behalf of a customer system).

Figure 3:
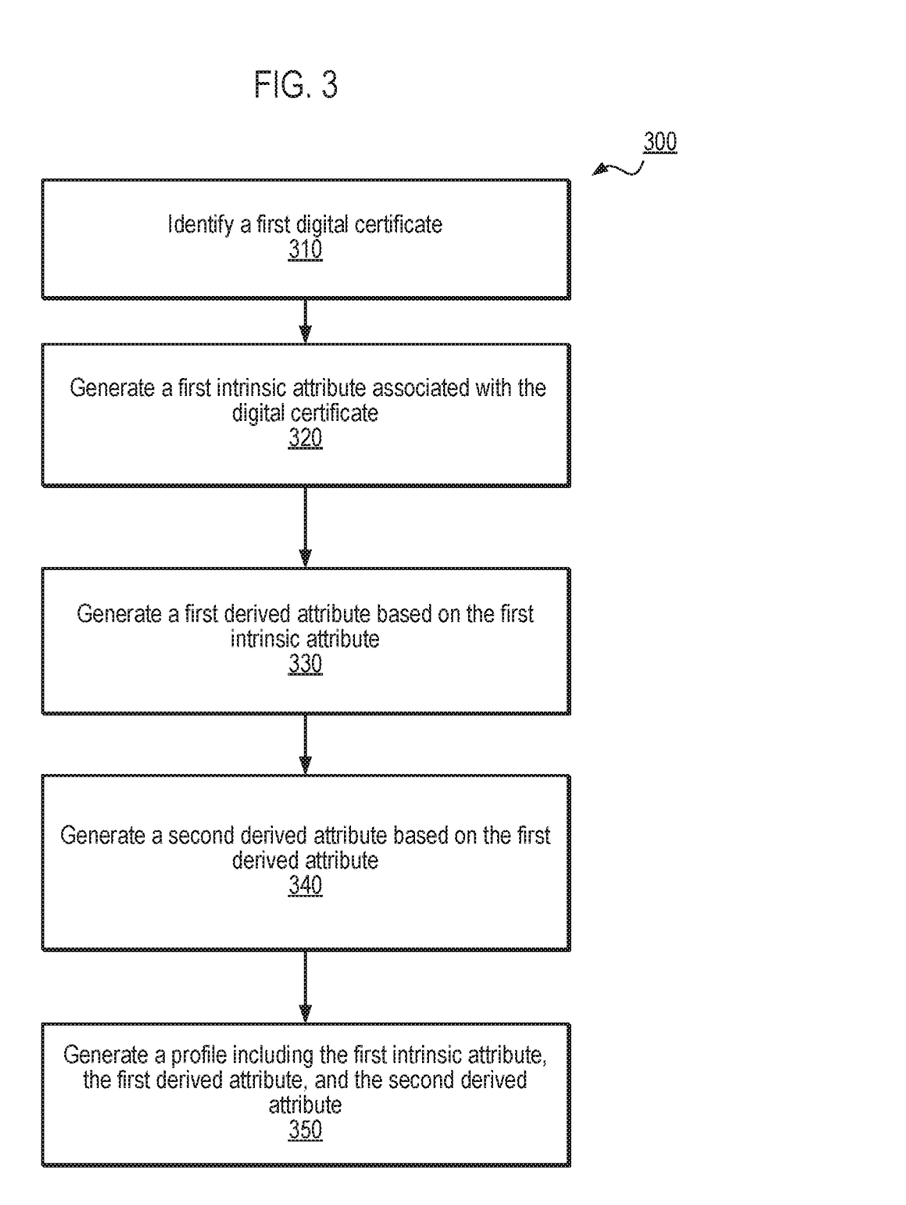
FIG. 3 is a flow diagram illustrating an example method of generating a profile associated with a digital certificate, according to one embodiment.

FIG. 3 illustrates a flowchart that provides an example of a process 300 executed by a system (e.g., the digital certificate management system 150 of FIG. 1) to generate a profile associated with a digital certificate. In block 310, a first digital certificate to be profiled is identified. In one embodiment, the first digital certificate can be identified via a communication with a customer system, a certificate authority, or other digital certificate source.

In block 320, a first intrinsic attribute associated with the first digital certificate is generated or determined. In one embodiment, the first intrinsic attribute is generated by extracting information from one or more fields of the first digital certificate. In one embodiment, the first intrinsic attribute may be a parameter, value, rule, definition, or other type of information that defines or describes a characteristic or functionality of the digital certificate. Example intrinsic attributes include a key usage value, a key size value, a public key algorithm type, etc. In one example, a value corresponding to the "common name" is extracted from the "Subject Name" field of the digital certificate. In this example, the common name value (e.g., "www.amazon.com") is stored as the first intrinsic attribute of the digital certificate.

In block 330, a first derived attribute is generated based on the first intrinsic attribute. In one embodiment, the first derived attribute may be determined by applying one or more heuristics to the first intrinsic attribute, either alone or in combination with another piece of information (e.g., another intrinsic attribute, metadata associated with the digital certificate, etc.). Continuing the example above, the first derived attribute may be whether the certificate has a fully qualified domain name. To determine this derived attribute, the system reviews the intrinsic attribute of the "common name" extracted from the "subject" field of the digital certificate. In the example, above, this intrinsic attribute has a value of www.amazon.com. Next, the system generates an additional intrinsic attribute by extracting a value from the "subject alternative name" field of the digital certificate. In this example, the additional intrinsic attribute is determined to be a subject alternative name value of "us.amazon.com".

In one embodiment, a heuristic is applied to the above identified intrinsic attributes (e.g., the subject name value and the subject alternative name value) to determine a derived attribute of "fully qualified domain name: true" or "fully qualified domain name: false". In this example, the heuristic is configured to check if the "common name" in the subject name field is a fully qualified domain name. If so, the heuristic is configured to check each subject alternative name to confirm the value is also a fully qualified domain name. If both are fully qualified domain names, a derived attribute of "fully qualified domain name: true" is generated.

In block 340, a hierarchical processing may be performed such that a second derived attribute is generated based at least in part on the first derived attribute. In one embodiment, a derived attribute may be determined based on any number of other derived attributes via the application of one or more heuristics to the previously generated derived attributes.

In block 350, a profile is generated for the digital certificate, the profile including at least the first intrinsic attribute, the first derived attribute, and the second derived attribute. In one embodiment, the profile may include any number of intrinsic attributes and derived attributes. In one embodiment, the profile represents the first digital certificate and may be used by the system to determine if the first digital certificate is suitable for use with an application, as described in greater detail below.

Figure 4:
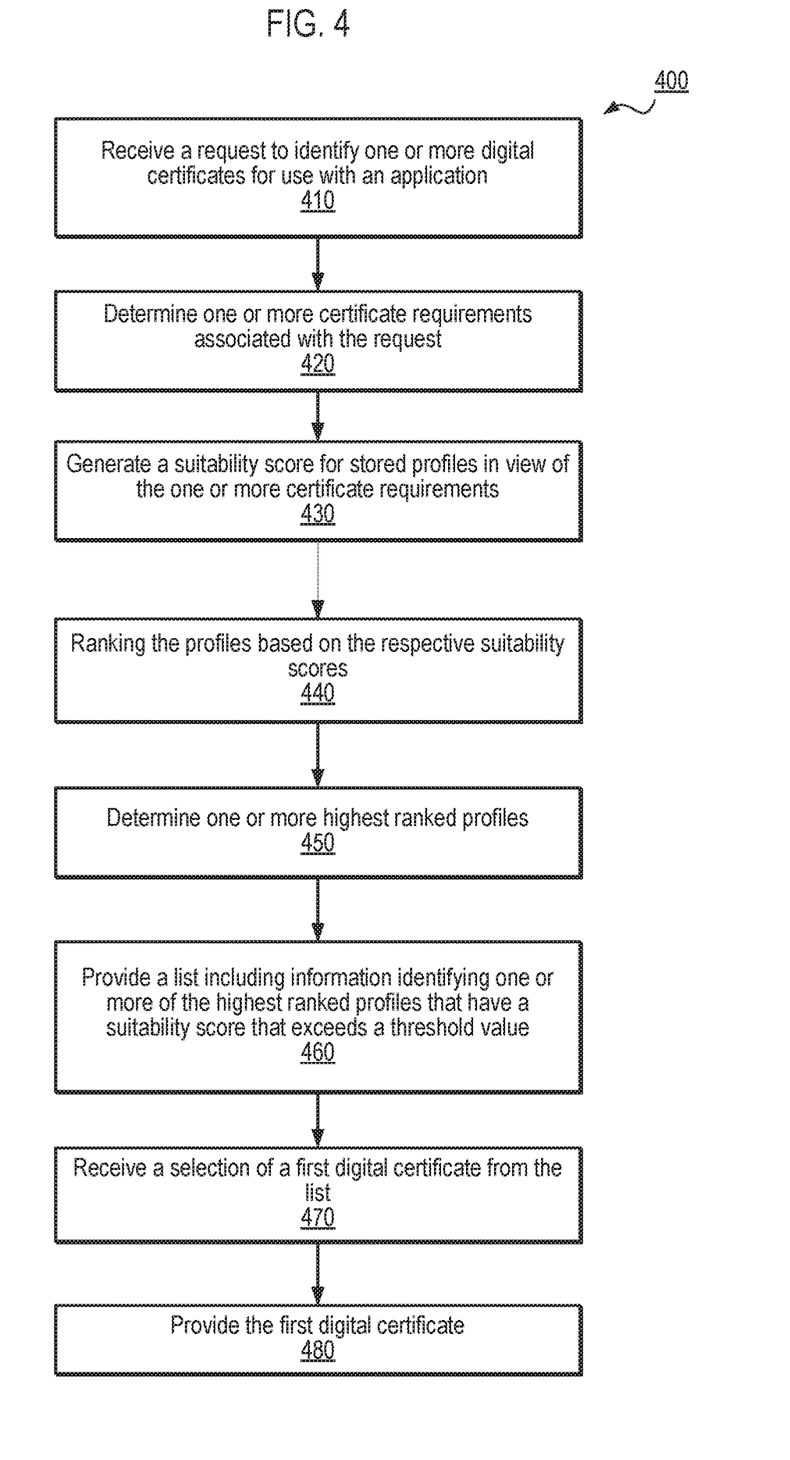
FIG. 4 is a flow diagram illustrating an example method of processing a request for a digital certificate suitable for use with an application, according to one embodiment.

FIG. 4 illustrates a flowchart that provides an example of a process 400 executed by a system (e.g., the digital certificate management system 150 of FIG. 1) to filter multiple digital certificates for use with a particular application. In block 410, the system receives a request to identify one or more digital certificates for use with an application. In one embodiment, the request is received from a customer system executing or causing the execution of the application. In one embodiment, the request includes information associated with the customer system (e.g., the customer data) which may include, for example, client types that use the application, the network conditions, the system parameters, a browser type, etc.

In block 420, one or more certificate requirements associated with the request are determined. For example, it may be determined that relates to a web server-based application. Accordingly, a certificate requirement is identified that indicates that a suitable digital certificate must have a fully qualified domain name.

In block 430, for each profile stored in a certificate inventory, a suitability score is generated. In one embodiment, the suitability score is based on a comparison of the one or more certificate requirements and the attributes (intrinsic and derived) of each respective profile. In one embodiment, a statistical comparison is performed on the certificate requirements and each of the profiles and a corresponding value is generated (e.g., a value on a scale of 0 to 100).

In block 440, the stored profiles are ranked according to their respective suitability scores. In block 450, a set including the highest ranked profiles is generated. In one embodiment, the set may include any suitable number of profiles, such as a top one (e.g., a recommend digital certificate), a top three, a top five, a top ten, etc. In one embodiment, the set of highest ranked profiles may be generated by comparing each of the suitability scores to a threshold value and including in the set those profiles that have a suitability score that exceeds the threshold value.

In block 460, a list including the highest ranked profiles is generated and presented to a source of the request in block

410 (e.g., a customer system). In one embodiment, the filtered list includes information identifying the digital certificates having a profile with a suitability score that exceeds the threshold value. In block 470, a selection of a digital certificate (e.g., a first digital certificate) from the list is received. In block 480, in response to the selection, the system provides the selected digital certificate to the requesting system. In one embodiment, the digital certificate is bound to the customer data identified from the request and provided to the customer system for use with the application.

Figure 5:
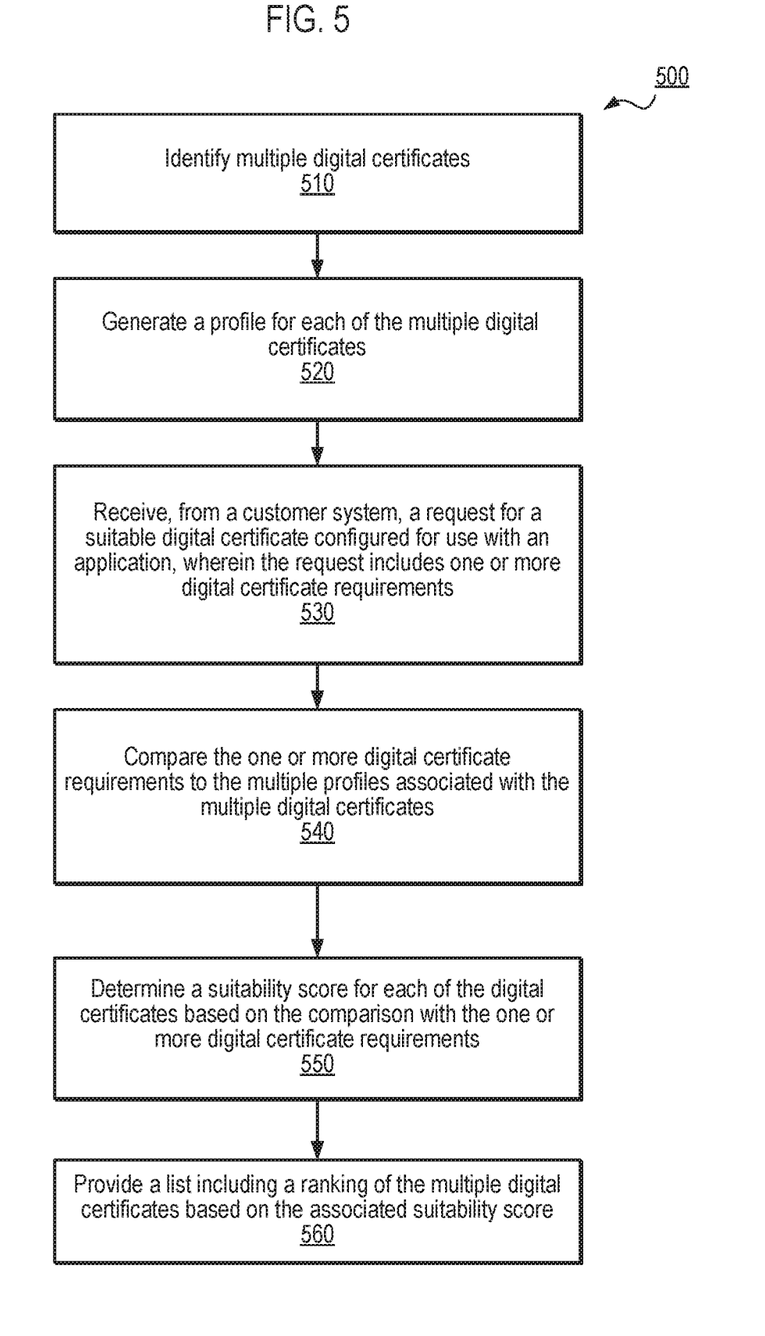
FIG. 5 is a flow diagram illustrating an example method of determining a suitability of multiple different digital certificates for a given application based on intrinsic and derived attributes associated with a digital certificate, according to one embodiment.

FIG. 5 illustrates a flowchart that provides an example of a process 500 executed by a system (e.g., the digital certificate management system 150 of FIG. 1) to enable the management and filtering of multiple digital certificates for use with a particular application (e.g., an application executed by or on behalf of a customer system). In one embodiment, the system executing the process 500 may be operatively coupled to one or more customer systems (seeking information relating to digital certificates for use with an application executed by or on behalf of the customer system) and one or more digital certificate sources (e.g., a system from which the digital certificate management system can obtain information about an existing digital certificate).

In block 510, the digital certificate management system identifies multiple digital certificates. In one embodiment, the functions in block 510 may be performed iteratively as a background process to provide for the continual updating and refreshing of a digital certificate inventory maintained by the digital certificate management system. In one embodiment, block 510 may be performed to delete old (inactive) digital certificates, update versions of a previously identified digital certificate, add newly created digital certificates, etc.

In block 520, a profile is generated for each of the identified digital certificates. The profile may include one or more intrinsic attributes of the digital certificate. An intrinsic attribute may be any identifying information, characteristic, parameter, value, classifier, etc. that may be determined or extracted from the one or more fields of the digital certificate. In one embodiment, the intrinsic attributes are those attributes that are defined by the creator of the certificate and serve as identifying indicia for the certificate. Example intrinsic attributes may include a key algorithm, a key size, a key usage, etc.

In one embodiment, each profile may also include one or more derived attributes associated with the digital certificate. In one embodiment, the one or more derived attributes may include information that is not explicitly defined in the one or more fields of the digital certificate. In this regard, the derived attributes may be determined by applying one or more heuristics or rules to the known information relating to the digital certificate (e.g., the intrinsic attributes and the metadata of the digital certificate). For example, a derived attribute referred to as the "public key type" may be derived based on an analysis of the public key algorithm associated with the digital certificate (e.g., a first intrinsic attribute) and the key size associated with the digital certificate (e.g., a second intrinsic attribute). In this example, the derived attribute (i.e., the public key type) may be formed based on the first and second intrinsic attributes. For example, the public key type attribute may be derived based on values associated with the intrinsic attributes and have an example value of RSA-2048 (e.g., an RSA algorithm and a 2048 key size).

In block 530, the digital certificate management system may receive a request from a customer system for information relating to one or more digital certificates that are suitable for use with an application executed by or on behalf of the customer system. The request may include information that identifies or can be used to identify one or more certificate requirements associated with the request. For example, a digital certificate requirement may indicate that the certificate must be an RSA algorithm type or have a key size greater than 1024-bit, or a combination of multiple requirements (e.g., the certificate is to be both RSA and greater than 1024-bit).

In block 540, the one or more digital certificate requirements are compared to the multiple profiles associated with the multiple digital certificates identified in block 510. In one embodiment, the digital certificate management system reviews each profile to determine if the profile includes attributes and/or corresponding values or parameters that match the one or more digital certificate requirements.

In block 550, using the information representing the matching between the requirements and profile attributes, a suitability score is generated for each of the digital certificates. In one embodiment, the suitability score is a value representing a suitability for use of the digital certificate with the particular application. In one embodiment, the suitability score may be a statistical measure of the degree of matching between the profile and the certificate requirements. For example, the suitability score may be a value on a scale of 0 to 100, wherein a score of 100 represents a highest level of suitability.

In block 560, the digital certificate management system generates a list including a ranking of the multiple digital certificates based on their respective suitability scores. For example, the list may include a list of all of the digital certificates with their associated suitability score as it relates to the particular application. In other example, the list may include a "top" set of digital certificates (e.g., a set of the three highest suitability scores, a set of the five highest suitability scores, a set of the ten highest suitability scores). In another example, the list may include a single "recommend" digital certificate that achieves the highest relative suitability score.

Figure 6:
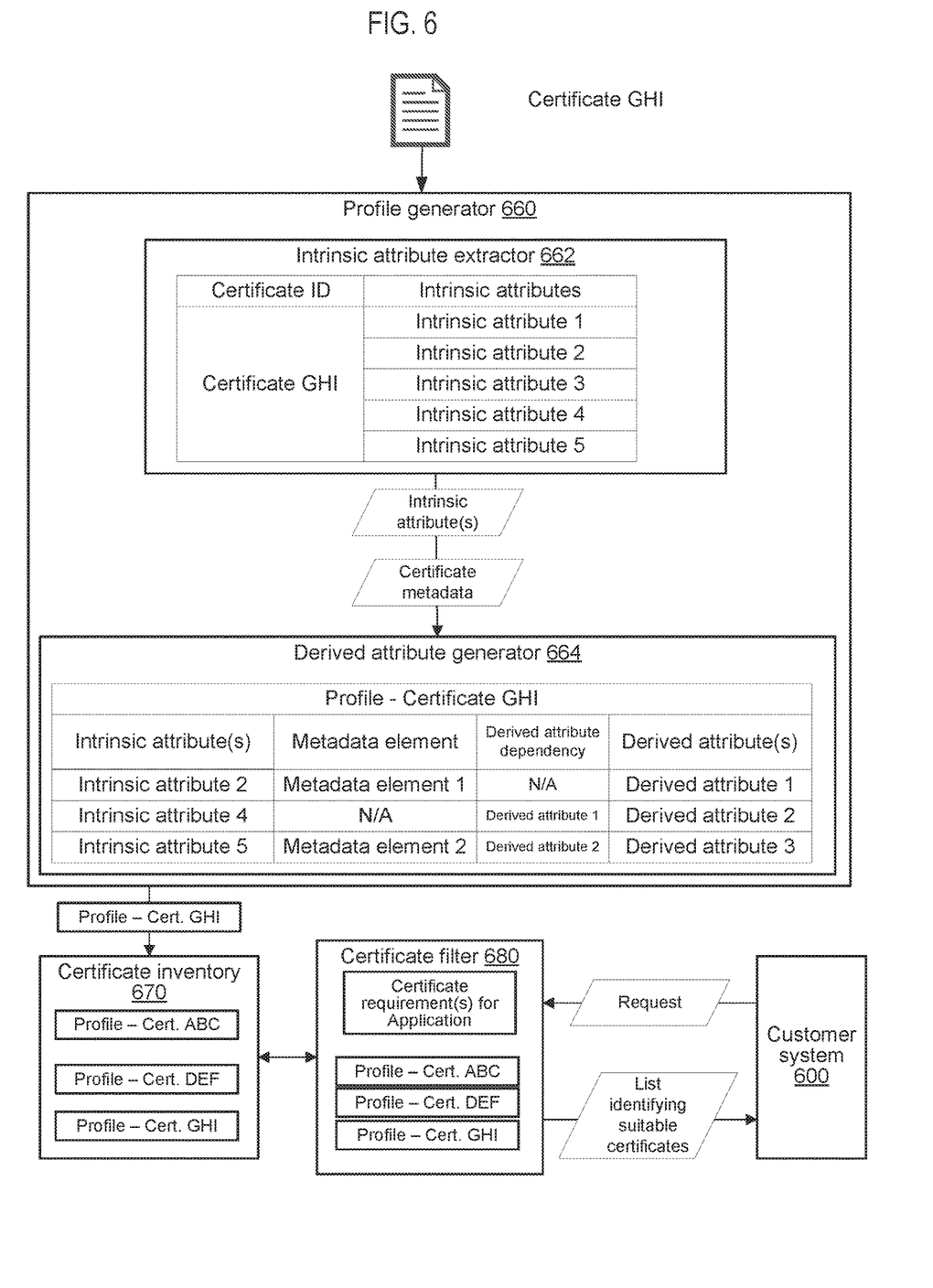
FIG. 6 illustrates an example generating of a list of suitable digital certificates for use with an application, according to one embodiment.

FIG. 6 illustrates an example implementation of the digital certificate management process according to the one or more embodiments of the methods and systems described herein. FIG. 6 illustrates an example digital certificate GHI identified by a profile generator 660 of a digital certificate management system. In one embodiment, the digital certificate GHI may be uploaded or otherwise received from a certificate source, such as a customer system or certificate authority. In one embodiment, the digital certificate GHI is provided to the profile generator 660 for the creation of a profile associated with the certificate.

In one embodiment, an intrinsic attribute extractor 662 of the profile generator 660 processes the certificate GHI. In one embodiment, the intrinsic attribute extractor 662 generates a label or certificate identifier (certificate GHI) and extracts multiple intrinsic attributes (e.g., intrinsic attributes 1-5) from the fields of the digital certificate GHI. As shown in FIG. 6, the extracted intrinsic attributes and metadata associated with digital certificate GHI are provided to a derived attribute generator 664. In one embodiment, the derived attribute generator 664 is configured to execute a set of heuristics or rules to generate one or more derived attributes associated with the digital certificate GHI. In the example shown in FIG. 6, a first derived attribute (derived attribute 1) is generated based on the application of one or more heuristics to intrinsic attribute 2 and metadata element 1. In an example, a first heuristic may examine a domain name of a digital certificate to determine properties of the domain name. A domain name may or may not be a fully qualified domain name. The first heuristic may determine whether the domain name associated with the digital certificate has particular properties that qualify that domain name as a fully qualified domain name. For example, the first heuristic may determine whether the domain name includes a hostname and a complete domain name that specifies a particular location in a tree hierarchy of a Domain Name System (DNS). If the domain name does not include these properties, then the heuristic may determine that the domain name is not a fully qualified domain name, and may generate a fully qualified domain name derived attribute with a value of "not fully qualified" for the digital certificate. If the domain name does have these properties, then the heuristic may determine that the domain name is a fully qualified domain name, and may generate a fully qualified domain name derived attribute with a value of "fully qualified" for the digital certificate. Numerous other heuristics and/or rules may analyze the digital certificates for different properties and generate other types of derived attributes.

In one embodiment, a hierarchical processing may be performed to identify a derived attribute, such that the derived attribute is generated based at least in part on another derived attribute. As shown in FIG. 6, a second derived attribute (derived attribute 2) is generated based on the application of heuristics to intrinsic attribute 4 and derived attribute 1. In addition, a third derived attribute (derived attribute 3) is generated based on intrinsic attribute 5, metadata element 2, and derived attribute 2 (which itself was generated based on derived attribute 1).

In one embodiment, a profile is generated for certificate GHI including the intrinsic attributes, derived attributes, and metadata elements associated with certificate GHI. The profile is provided to certificate inventory 670 where it is stored with other previously generated profiles (e.g., the profiles for digital certificates ABC and DEF. In one embodiment, the certificate inventory 670 is indexed by intrinsic attribute, derived attribute, metadata, or a combination thereof such that a search may be performed to identify matches using the certificate requirements associated with an application.

In one embodiment, a customer system 600 may send a request for processing by a certificate filter 680 of the digital certificate management system. In one embodiment, the request includes information relating to an underlying application for which a digital certificate is needed. Based on the information associated with the request, the certificate filter 680 determines one or more certificate requirements for the application. In one embodiment, the certificate requirements are determined by analyzing one or more of the traffic patterns associated with the application, the one or more clients or client types that are using the application, a type or category of the application (e.g., a web browser-based application, a code signing application, an e-mail signature application, etc.).

In one embodiment, the certificate filter 680 compares the certificate requirements to the profiles stored in the certificate inventory 670. In one embodiment, the certificate filter 680 generates a search including criteria based on the certificate requirement. The search is performed against certificate inventory and the one or more profiles matching the search criteria are analyzed. In one embodiment, the certificate filter 680 generates a suitability score for one or more of the profiles as it relates to the certificate requirements. In one example, the certificate filter 480 may generate a suitability score for each of the profiles in the certificate inventory, or a subset of the profiles based on an initial filtering of the inventory based on the generated search criteria. For example, the certificate filter 680 may perform a comparison of the certificate requirements to certain profiles that one or more prioritized search elements determined based on the certificate requirements (e.g., only compare profiles that include intrinsic attribute 3, only compare profiles that include both intrinsic attribute 3 and derived attribute 2).

In one embodiment, based on the comparison, the certificate filter 680 provides a list identifying one or more suitable certificates to the customer system 600. In one embodiment, the list may include one or more digital certificates ordered based on their respective suitability scores. In one embodiment, the list may include only the one or more digital certificates that have a suitability score that meets or exceeds a threshold suitability level or value (e.g., a threshold value of 90).

In one embodiment, the certificate filter 680 receives a selection of a desired digital certificate from the customer system. In one embodiment, the certificate filter 680 creates a certificate call with data collected from the customer system (i.e., customer data) and provisions the selected digital certificate bound to the customer data to the customer system 600.

Figure 7:
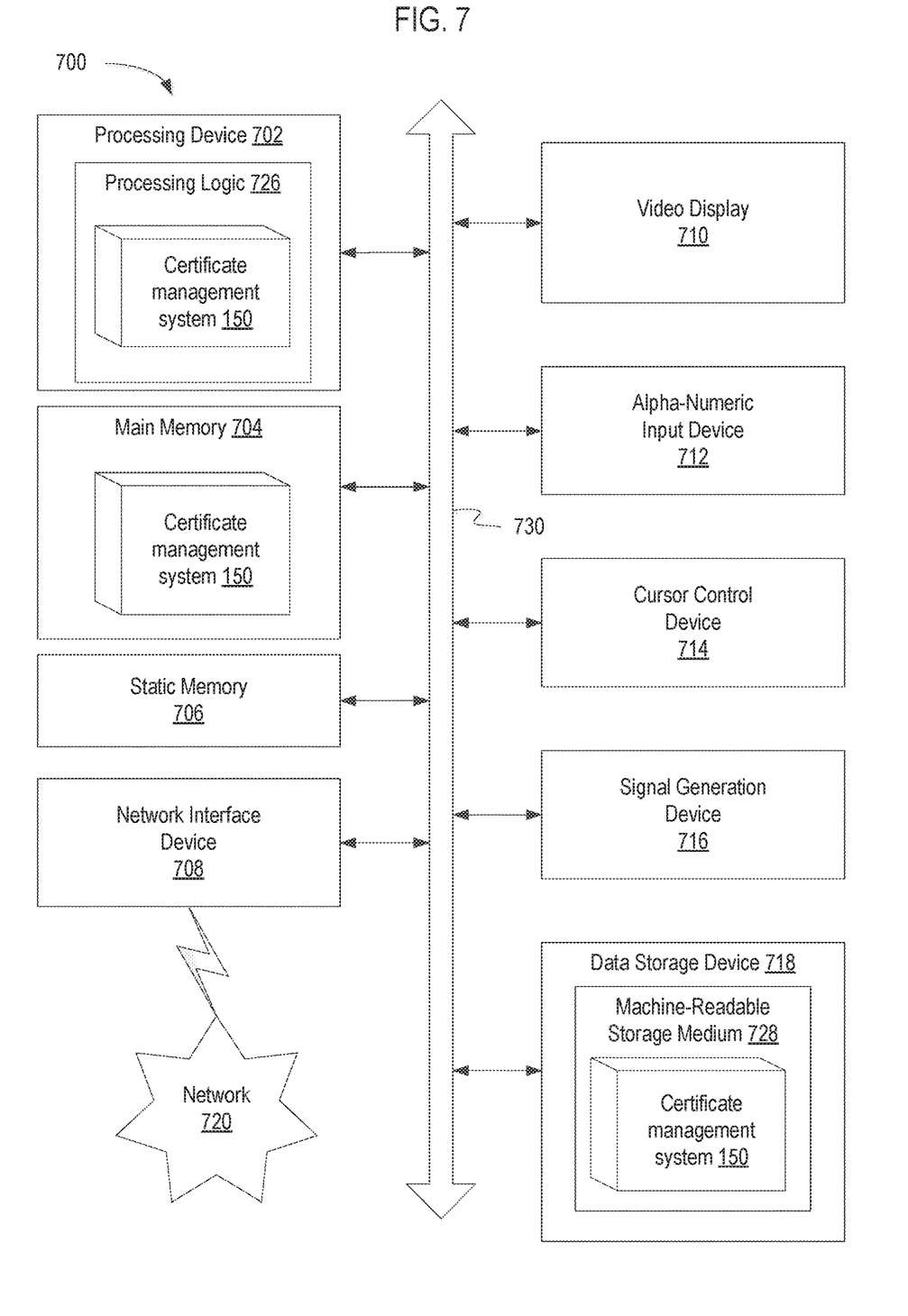
FIG. 7 is a schematic block diagram that provides an example illustration of a computing environment executing instructions relating to managing digital certificates, according to one embodiment.

FIG. 7 illustrates a diagrammatic representation of a machine in the example form of a computer system 700 including a set of instructions executable by an object upload management system (e.g., digital certificate management system 150 of FIG. 1) to cause the system to perform any one or more of the methodologies discussed herein. In one embodiment, the object upload management system operates in a cloud computing environment including storage for storing a large object uploaded by a source system. In one embodiment, the digital certificate management system 150 may include instructions to enable execution of the processes and corresponding components shown and described in connection with FIGS. 1-6.

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. In various implementations of the present disclosure, the processing device 702 is configured to execute instructions for the digital certificate management system for performing the operations and processes described herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable medium 728 on which is stored one or more sets of instructions of the digital certificate management system embodying any one or more of the methodologies or functions described herein. The instructions may also reside, completely or at least partially, within the main memory 704 and/or within processing logic 726 of the processing device 702 during execution thereof by the computer system 700, the main memory 704 and the processing device 702 also constituting computer-readable media.

The instructions may further be transmitted or received over a network 720 via the network interface device 708. While the computer-readable storage medium 728 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating", "identifying", "providing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    identifying a plurality of digital certificates comprising a first digital certificate and a second digital certificate;
    generating a first profile comprising:
        a first set of intrinsic attributes extracted from one or more fields of the first digital certificate; and
        a first set of derived attributes derived based on an analysis of at least one of the first set of intrinsic attributes or first metadata associated with the first digital certificate;

generating a second profile comprising:
- a second set of intrinsic attributes extracted from one or more fields of the second digital certificate; and
- a second set of derived attributes derived based on an analysis of at least one of the second set of intrinsic attributes or second metadata associated with the second digital certificate;

receiving, from a customer system, a request for a suitable digital certificate configured for use with an application, wherein the request comprises a first digital certificate requirement;

comparing the first set of intrinsic attributes and the first set of derived attributes to the first digital certificate requirement to determine a first suitability score;

comparing the second set of intrinsic attributes and the second set of derived attributes to the first digital certificate requirement to determine a second suitability score; and providing, in response to the request, a list comprising a ranking of the first digital certificate and the second digital certificate based on the first suitability score and the second suitability score.

2. The method of claim 1, further comprising receiving, from the customer system, a selection of the first digital certificate from the list.

3. The method of claim 2, further comprising:
in response to the selection, generating a certificate call for the first digital certificate, the certificate call comprising customer data associated with the customer system; and
providing, to the customer system, the first digital certificate comprising the customer data.

4. The method of claim 1, further comprising:
generating a first derived attribute; and
generating a second derived attribute based at least in part on the first derived attribute.

5. A system comprising:
a processing device; and
a memory to store computer-executable instructions that, if executed, cause the processing device to:
for each of a plurality of digital certificates, generate a profile comprising:
a set of first attributes extracted from information defining a digital certificate; and
a set of second attributes based on an analysis of at least a portion of the set of first attributes;
identify a first digital certificate requirement associated with an application; and
provide a list identifying a first digital certificate in response to the first digital certificate requirement matching at least a portion of the profile associated with the first digital certificate.

6. The system of claim 5, the processing device to:
extract information from one or more fields of the digital certificate; and
determine one or more intrinsic attributes based on the information.

7. The system of claim 5, the processing device to apply one or more heuristics to one or more first attributes to generate one or more derived attributes.

8. The system of claim 5, wherein the set of first attributes comprises one or more intrinsic attributes associated with the digital certificate, and wherein the set of second attributes comprises one or more derived attributes associated with the digital certificate.

9. The system of claim 8, the processing device to maintain a data store comprising a plurality of profiles, wherein each profile corresponds to one of the plurality of digital certificates.

10. The system of claim 9, the processing device to index the data store by at least one of a first intrinsic attribute or a first derived attribute.

11. The system of claim 9, the processing device to search the data store using the first digital certificate requirement to identify one or more profiles comprising at least one of an intrinsic attribute or a derived attribute matching the first digital certificate requirement.

12. The system of claim 5, wherein the first digital certificate requirement is identified by analyzing at least one of a traffic pattern associated with the application, one or more clients associated with the application, or one or more web browser types associated with the application.

13. The system of claim 5, the processing device to:
receive, from the customer system, a selection of the first digital certificate from the list; and
provide the first digital certificate to the customer system.

14. A non-transitory computer-readable storage device storing computer-executable instructions that, if executed by a processing device, cause the processing device to:
for each of a plurality of digital certificates, generate a profile comprising:
a set of first attributes extracted from information defining a digital certificate; and
a set of second attributes based on an analysis of at least a portion of the set of first attributes;
identify a first digital certificate requirement associated with an application; and
provide a list identifying a first digital certificate in response to the first digital certificate requirement matching at least a portion of the profile associated with the first digital certificate.

15. The non-transitory computer-readable storage device of claim 14, the processing device to:
extract information from one or more fields of the digital certificate; and
determine one or more intrinsic attributes based on the information.

16. The non-transitory computer-readable storage device of claim 14, the processing device to apply one or more heuristics to one or more first attributes to generate one or more derived attributes.

17. The non-transitory computer-readable storage device of claim 14, the processing device to maintain a data store comprising a plurality of profiles, wherein each profile corresponds to one of the plurality of digital certificates.

18. The non-transitory computer-readable storage device of claim 17, the processing device to search the data store using the first digital certificate requirement to identify one or more profiles comprising at least one of an intrinsic attribute or a derived attribute matching the first digital certificate requirement.

19. The non-transitory computer-readable storage device of claim 14, the processing device to:
generate a first derived attribute of the set of second attributes; and
generate a second derived attribute based at least in part on the first derived attribute.

20. The non-transitory computer-readable storage device of claim 14, the processing device to:
receive, from the customer system, a selection of the first digital certificate from the list; and
provide the first digital certificate to the customer system.

* * * * *